US 11,243,558 B2

(12) United States Patent
Kleinitz et al.

(10) Patent No.: US 11,243,558 B2
(45) Date of Patent: Feb. 8, 2022

(54) ULTRASONIC FLOW MEASUREMENT SYSTEM INCLUDING A SIGNAL GENERATOR EXCITING THE TRANSDUCERS AND A PHASE DIFFERENTIATOR

(71) Applicant: Renesas Electronics Corporation, Tokyo (JP)

(72) Inventors: Axel Kleinitz, Duesseldorf (DE); Richard Dalby, Buckinghamshire (GB)

(73) Assignee: Renesas Electronics Corporation, Tokyo (JP)

( * ) Notice: Subject to any disclaimer, the term of this patent is extended or adjusted under 35 U.S.C. 154(b) by 157 days.

(21) Appl. No.: 16/622,011

(22) PCT Filed: Jun. 12, 2017

(86) PCT No.: PCT/EP2017/064259
§ 371 (c)(1),
(2) Date: Dec. 12, 2019

(87) PCT Pub. No.: WO2018/228658
PCT Pub. Date: Dec. 20, 2018

(65) Prior Publication Data
US 2020/0209030 A1 Jul. 2, 2020

(51) Int. Cl.
*G06F 1/04* (2006.01)
*G01F 1/66* (2006.01)
*G06F 1/08* (2006.01)

(52) U.S. Cl.
CPC .............. *G06F 1/04* (2013.01); *G01F 1/662* (2013.01); *G01F 1/667* (2013.01); *G06F 1/08* (2013.01)

(58) Field of Classification Search
None
See application file for complete search history.

(56) References Cited

U.S. PATENT DOCUMENTS

| | | | |
|---|---|---|---|
| 4,611,496 A | 9/1986 | Komachi | |
| 4,922,750 A * | 5/1990 | Magori | G01F 1/667 73/114.32 |
| 6,370,963 B1 | 4/2002 | Feller | |
| 6,422,093 B2 | 7/2002 | Feller | |
| 6,640,311 B1 * | 10/2003 | Knowles | G06F 1/08 327/7 |
| 2001/0037688 A1 * | 11/2001 | Chang | G01F 1/66 73/861.29 |
| 2004/0107779 A1 | 6/2004 | Kishimoto et al. | |
| 2016/0282170 A1 | 9/2016 | Drachmann | |

FOREIGN PATENT DOCUMENTS

CN 104121956 A * 10/2014

* cited by examiner

*Primary Examiner* — Harshad R Patel
(74) *Attorney, Agent, or Firm* — Burr & Forman, LLP

(57) ABSTRACT

An ultrasonic flow measurement system may include a signal generator configured to generate a first excitation signal for a first ultrasonic transducer and a second excitation signal for a second, different ultrasonic transducer. The system may further include a phase differentiator configured to generate a differential phase angle signal indicative of a difference in phase angle between first and second receive signals received from the first and second transducers which is indicative of flow rate.

13 Claims, 13 Drawing Sheets

ULTRASONIC FLOW MEASUREMENT SYSTEM INCLUDING A SIGNAL GENERATOR EXCITING THE TRANSDUCERS AND A PHASE DIFFERENTIATOR

FIELD OF THE INVENTION

The present invention relates to ultrasonic flow measurement.

BACKGROUND

Ultrasonic flow measurements in a fluid can be performed using a pair of ultrasonic transducers. Traditionally, such measurements employ so called time-of-flight measurements.

Another approach is to use phase-based measurements. However, such measurements require more than two ultrasonic transducers or necessitate complex and expensive arrangements to compensate for the effects of changes in temperature and pressure.

SUMMARY

According to a first aspect of the present invention there is provided an ultrasonic flow measurement system. The system comprises a signal generator configured to generate a first excitation signal for a first ultrasonic transducer and a second excitation signal for a second, different ultrasonic transducer. The system comprises a phase differentiator configured to generate a differential phase angle signal indicative of a difference in phase angle between first and second receive signals received from the first and second transducers. The differential phase angle signal is indicative of flow rate.

Using a differential phase angle can enable use of only two ultrasonic transducers to carry out a phase-based measurement of flow by compensating for errors which can result from changes in temperature and pressure, and in a way which is simple and cheap to implement.

The signal generator may be configured to provide the first and second excitation signals to the first and second transducers respectively such that the first and second receive signals overlap when received by the phase differentiator. For example, the signal generator may be configured may be configured such that the phase differentiator receives the first and second receive signals, or portions of the first and second receive signals, simultaneously or at the same time. This can reduce the time needed to perform a measurement and so decrease the operating time to be reduced and so cut energy consumption.

The signal generator may comprise a clock configured to generate a clock signal. The signal generator may be configured to generate the first and second excitation signals in dependence upon the clock signal. The signal generator may further comprise a phase shifter arranged to cause a phase shift to be introduced between the first and second excitation signals. For example, the phase shifter may cause a phase shift to be introduced into the first excitation signal.

The phase differentiator may comprise a first phase discriminator configured to generate a first phase shift signal in dependence upon a first receive signal from the first ultrasonic transducer which is indicative of a phase shift between the first receive signal and the second excitation signal, a second phase discriminator configured to generate a second phase shift signal in dependence upon a second receive signal from the second ultrasonic transducer which is indicative of a phase shift between the second receive signal and the first excitation signal. The system also comprises a differential amplifier configured to obtain a differential signal in dependence upon the first and second phase shift signals.

The first discriminator may comprise a first XOR gate having first and second inputs and an output and a first low pass filter having an input and an output. The first input of the first XOR gate may be configured to receive the first receive signal or a signal obtained from the first measured signal and the second input of the first XOR gate may be configured to receive a signal used to generate the second excitation signal, the second excitation signal or a signal obtained from the second excitation signal. The output of the first XOR gate may be coupled to the input of the first low pass filter and the output of the first low pass filter may provide the first phase shift signal. The second discriminator may comprise a second XOR gate having first and second inputs and an output and a second low pass filter having an input and an output. The first input of the second XOR gate may be configured to receive the second receive signal or a signal obtained from the second measured signal and the second input of the second XOR gate may be configured to receive a signal used to generate the first excitation signal, the first excitation signal or a signal obtained from the first excitation signal. The output of the second XOR gate may be coupled to the input of the second low pass filter and the output of the second low pass filter may provide the second phase shift signal.

The phase differentiator may comprise an XOR gate having first and second inputs and an output and a low-pass filter having an input and an output. The first input of the XOR gate may be configured to receive the first receive signal or a signal obtained from the first receive signal, and the second input of the XOR gate may be configured to receive the second receive signal or a signal obtained from the second receive signal. The output of the XOR gate may be coupled to the input of the low pass filter, and the output of the low-pass filter may provide the differential phase angle signal.

The flow measurement system may further comprise an analogue-to-digital converter configured to sample the differential signal. The flow measurement system may further comprise a controller configured to control the signal generator. The controller may comprise a processor. The controller may include an operational amplifier for the differential amplifier. The controller may be an integrated circuit, such as a microcontroller. The controller may be configured to vary frequency of a clock signal used to generate the first and second excitation signals so as to reduce the differential signal at zero flow.

The flow measurement system may further comprise a first transceiver comprising a driver and a receiver, wherein the driver is configured to output the first excitation signal and the receiver is configured to receive the first receiver signal. The flow measurement system may further comprise a second transceiver comprising a driver and a receiver, wherein the driver is configured to output the second excitation signal and the receiver is configured to receive the second receive signal.

The flow measurement system may further comprise a first impedance matching circuit for providing impedance matching between the first transducer and inputs to the first transceiver receiver and a second impedance matching circuit for providing impedance matching between the second transducer and inputs to the second transceiver receiver.

The flow measurement system may further comprise a first ultrasonic transducer configured to receive the first excitation signal from the signal generator and to provide the first receive signal to the first phase discriminator, and a second ultrasonic transducer configured to receive the second excitation signal from the signal generator and to provide the first receive signal to the second phase discriminator.

The low-pass filter(s) may each comprise a (respective) passive low-pass filter(s) such as an RC circuit or an LC circuit or an active low-pass filter(s) such as Butterworth circuit. The low-pass filter(s) may each comprise one, two or more than two stages.

According to a second aspect of the present invention there is provided a method of performing an ultrasonic flow measurement. The method comprises causing generation of a first excitation signal for a first ultrasonic transducer and a second excitation signal for a second, different ultrasonic transducer. The method comprises enabling generation of a differential phase angle signal indicative of a difference in phase angle between first and second receive signals received from the first and second transducers which is indicative of flow rate.

The method may further comprise, while there is no flow, causing variation of frequency of a clock signal used to generate the first and second excitation signals so as to reduce, e.g. minimise, the differential signal. The method may further comprise storing (e.g. in non-volatile memory or computer-readable storage) the differential signal.

According to a third aspect of the present invention there is provided a computer program which, when executed by data processing apparatus (such as a microcontroller), causes the data processing apparatus to perform the method according to second aspect of the invention.

According to a fourth aspect of the present invention there is provided a computer program product comprising a computer readable medium (such as a non-transitory computer readable medium) storing a computer program according to third aspect of the invention.

BRIEF DESCRIPTION OF THE DRAWINGS

Certain embodiments of the present invention will now be described, by way of example, with reference to the accompanying drawings, in which.

DETAILED DESCRIPTION OF CERTAIN EMBODIMENTS

Phase-Based Ultrasonic Flowmeter System

Figure 1:
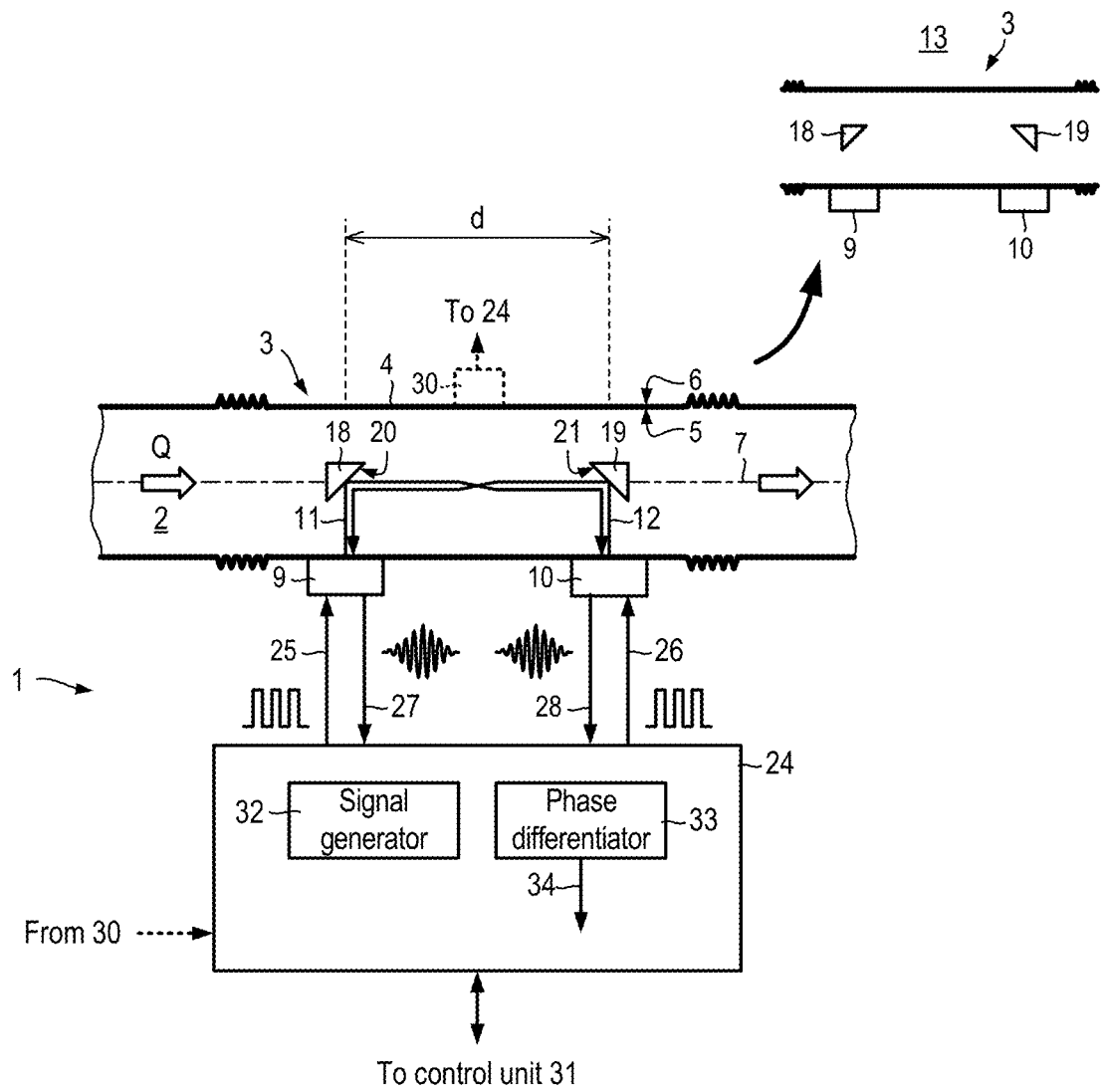
FIG. 1 is a schematic block diagram of a phase-based ultrasonic flowmeter system for measuring flow rate of a fluid.

Referring to FIG. 1, a phase-based ultrasonic flowmeter system 1 for measuring flow rate of a fluid 2, such as oil, oil-derivatives (such as petroleum), water, natural gas, or industrial gases, in a pipe 3 is shown. The pipe 3 comprises a wall 4 having inner and outer surfaces 5, 6 and a longitudinal axis 7.

The system 1 includes first and second ultrasonic transducers 9, 10 provided in or on the pipe wall 4 and offset along the longitudinal axis 7 by a distance d, for example, which may be, for example, between 70 and 100 mm. The ultrasonic transducers 9, 10 preferably take the form of piezoelectric transducers. The transducers 9, 10 are arranged to generate ultrasonic waves 11, 12 which propagate in opposite directions through the fluid 2 (herein also referred to as "media"). As will be explained in more detail hereinafter, each transducer 9, 10 serves as both emitter and receiver of ultrasonic waves. As will be explained in more detail hereinafter, the transducer 9, 10 are excited simultaneously and (at a different time) measured simultaneously, although they can be excited sequentially and measured sequentially. Herein, the first transducer 9 is referred to as the "upstream transducer" and the second transducer 10 is referred to as the "downstream transducer" since the fluid 2 flows past the first transducer 9 first and past the second transducer 10 later.

The pipe 3 and transducers 9,10 may be integrated in a flowmeter unit 13 which can be interposedly connected between adjoining pipes. The integrated (or "self-contained") flowmeter unit 13 also includes first and second oppositely-facing reflector blocks 18, 19 that are offset along the longitudinal axis 7 and having first and second reflecting surfaces 20, 21 respectively which are inclined at 45° with respect to the longitudinal axis 7. The first and second ultrasonic transducers 9, 10 lie on the same side of the pipe 3 and are arranged to transmit and receive ultrasonic waves 11, 12 radially into and out of the pipe 3, i.e. perpendicular to the longitudinal axis 7 of the pipe 3. The first and second reflector blocks 18, 19 are arranged so as to reflect a radially-oriented incoming ultrasonic wave 11, 12 from one transducer 9, 10, along through the fluid 2 parallel or anti-parallel to the longitudinal axis 7, and then to reflect the wave outwardly radially towards the other transducer 9, 10.

The system 1 includes a control unit 24 (which may be referred to as a "head unit" or "register") for generating respective electrical excitation signals 25, 26 for the transducers 9, 10 and processing respective electrical receive signals 27, 28 generated by the transducers 9, 10. The system 1 may also measure temperature of the fluid 2 inside the pipe 3 using a temperature sensor 30. The head unit 24 may communicate via a wired or wireless link (not shown) with a remotely-located control unit 31.

The head unit 24 includes a signal generator 32 which generates the excitation signals 25, 26 and a phase differentiator 33 which generates a differential phase angle signal 34 identifying a difference in phase angle between the receive signals 27, 28 received from the first and second transducers 9, 10 and which is indicative of flow rate.

The excitation frequency may lie in the range of, for example, 250 kHz to 2 MHz for water (and media having similar acoustic properties) and 100 to 1000 kHz for a gas. The excitation signals may comprise tone burst comprising, for example, at least 10 or at least 20 cycles. The number of cycles, n, preferably do not last longer than the propagation time (which can be of the order of magnitude of 10 μs) and may depend on the circuit settling times.

Phase-Based Measurement

The phase-based ultrasonic flowmeter system 1 determines flow rate based on changes in phase of an ultrasonic wave resulting from flow of a fluid. The speed of an ultrasonic wave propagating in a fluid increases or decreases due to fluid flow, resulting in a Doppler wavelength shift:

$$v_{signal} = v_{sound} + v_{flow} = \lambda_{(v)} \cdot f \quad (1)$$

where $v_{signal}$ is the velocity of the ultrasonic wave in the flowing fluid, $v_{sound}$ is the velocity of the ultrasonic wave in the fluid when static, $v_{sound}$ is the velocity of the flowing fluid, $\lambda$ is the wavelength of the ultrasonic wave and f is the frequency.

There are, however, other sources of phase shifts. For example, a phase shift is introduced when a transducer converts an electrical signal into an acoustic signal or vice versa. Also, a phase shift occurs as result of the time of flight (TOF) arising from separation of the transducers. Thus, rather than detect absolute phase shifts, the system 1 employs relative phase shifts.

Figure 2:
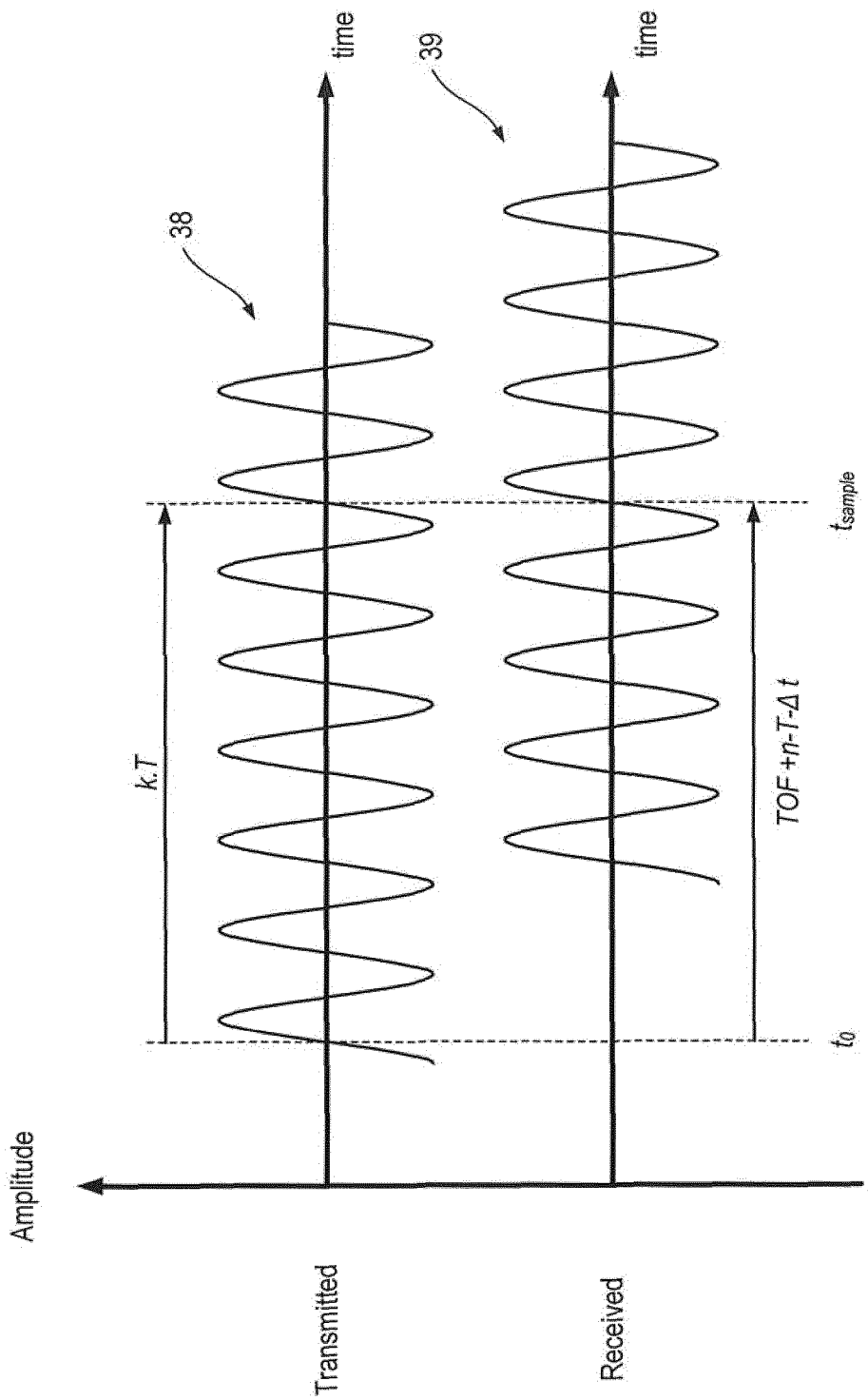
FIG. 2 illustrates time shift of an ultrasonic wave propagating in a fluid.

Referring to FIG. 2, to help understand principles behind a phase-based measurement, time-shifting of a periodic ultrasonic wave 38 having a period T transmitted by a first ultrasonic transducer and received by a second ultrasonic transducer, separated by a distance d, is shown.

Taking time $t_o$ as a reference point, a measurement of the received wave 39 is carried out k cycles later (where k is an integer number) at time $t_{sample}$. Thus:

$$k \cdot T = TOF + nT - \Delta t_{(vFlow)} \quad (2)$$

$$TOF = d/(v_{sound} + v_{flow}) \quad (3)$$

$$\Delta t_{(vFlow)} = \Delta t_{(vFlow=0)} + \Delta t_v \quad (4)$$

where TOF is time of flight, n is a number of complete cycles of the received wave 49 (i.e. k>n) and $\Delta t_{(vFlow)}$ is a timing offset arising from propagation through the fluid. The timing offset arising from propagation $\Delta t_{(vFlow)}$ includes a first contribution $\Delta t_{(vFlow=0)}$ when there is no flow and a second contribution $\Delta t_v$ arising from fluid flow, i.e. the relative phase shift between when there is no flow and when there is flow. Thus, the relative phase shift $\Delta t_v$ can be expressed as:

$$\Delta t_v = (d \cdot v_{Flow})/((v_{Sound} \cdot (v_{Sound} + v_{Flow})) \quad (5)$$

Figure 3:
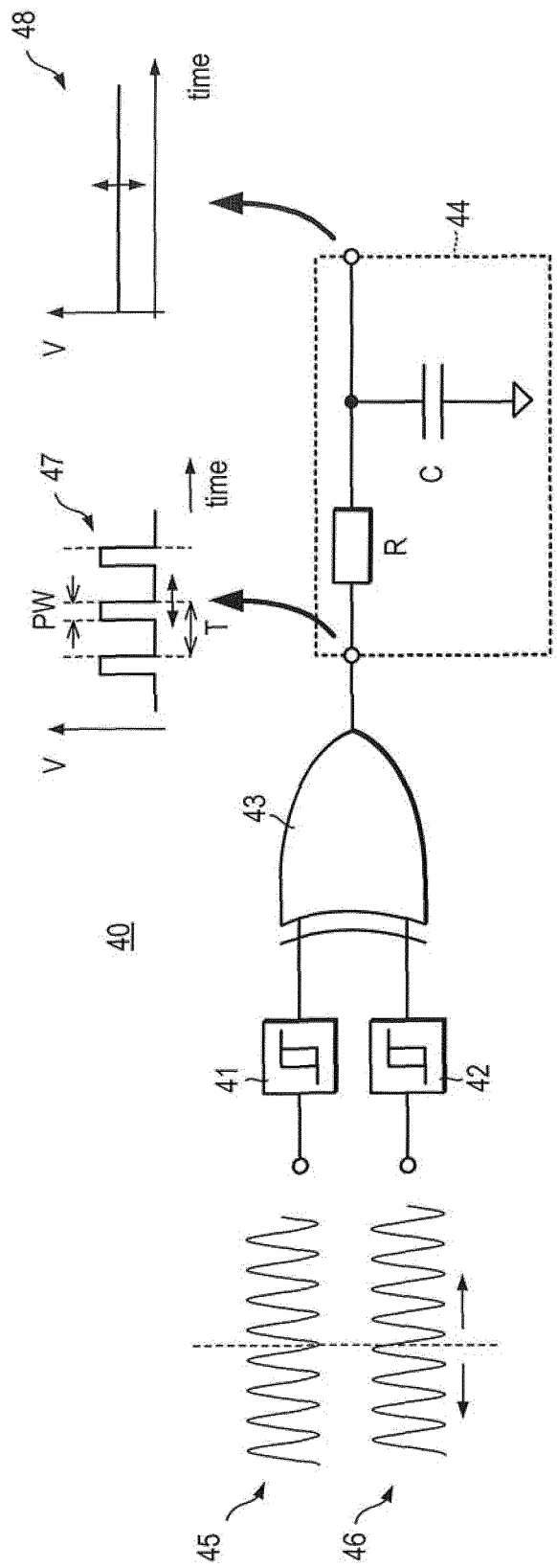
FIG. 3 is a circuit diagram of a phase discriminator.

Referring to FIG. 3, to help understand how the ultrasonic flowmeter system 1 measures a relative phase shift between the transmitted and received waves, a simplified phase discriminator 40 is shown.

The phase discriminator 40 comprises first and second signal-conditioning circuits 41, 42 (for example in the form of high-gain amplifiers) to convert sine wave signals into square wave signals, an XOR gate 43 and a low-pass filter 44 comprising a resistor R and a capacitor C.

First and second electrical signals 45, 46 corresponding to the transmitted and received waves 38, 39 (FIG. 2) are supplied to the inputs of the first and signal conditioning circuits 41, 42 respectively. The first electrical signal 45 may be the electrical excitation signal supplied to the first transducer which generates the transmitted wave 38 (FIG. 2) and the second electrical signal 46 may be the signal generated by the second transducer.

The signal conditioning circuits 41, 42 convert the signals 45, 46 into respective two-level square waves (not shown). The outputs of the signal conditioning circuits 41, 42 are supplied to the inputs of the XOR gate 43. A train of pulses 47 in the form of a pulse width modulated (PWM) signal appears at the output of the XOR gate 43. The width of a pulse PW depends on the degree of overlap between square waves in the signals received from the signal conditioning circuits 41, 42, in other words, pulse width PW depends on phase correlation. When there is no phase difference between the signals (i.e. there is phase correlation), the pulse width PW is vanishingly small. As the phase difference between the signals increases, the pulse width PW and, thus, the duty cycle of the PWM signal 47 increases. The low-pass filter 44 is used to convert the PWM signal 47 into a dc signal 48 (herein also referred to a "dc voltage" or "dc level").

As will now be explained in more detail, the difference between dc signals for upstream and downstream measurements can be taken to produce a differential dc signal (or "differential dc voltage" or "differential dc level") to remove errors and compensate for other time delays.

Temperature Compensation—Differential Phase Difference Measurement

Factors, such as temperature and pressure, can affect relative phase shift and lead to errors.

Figure 4:
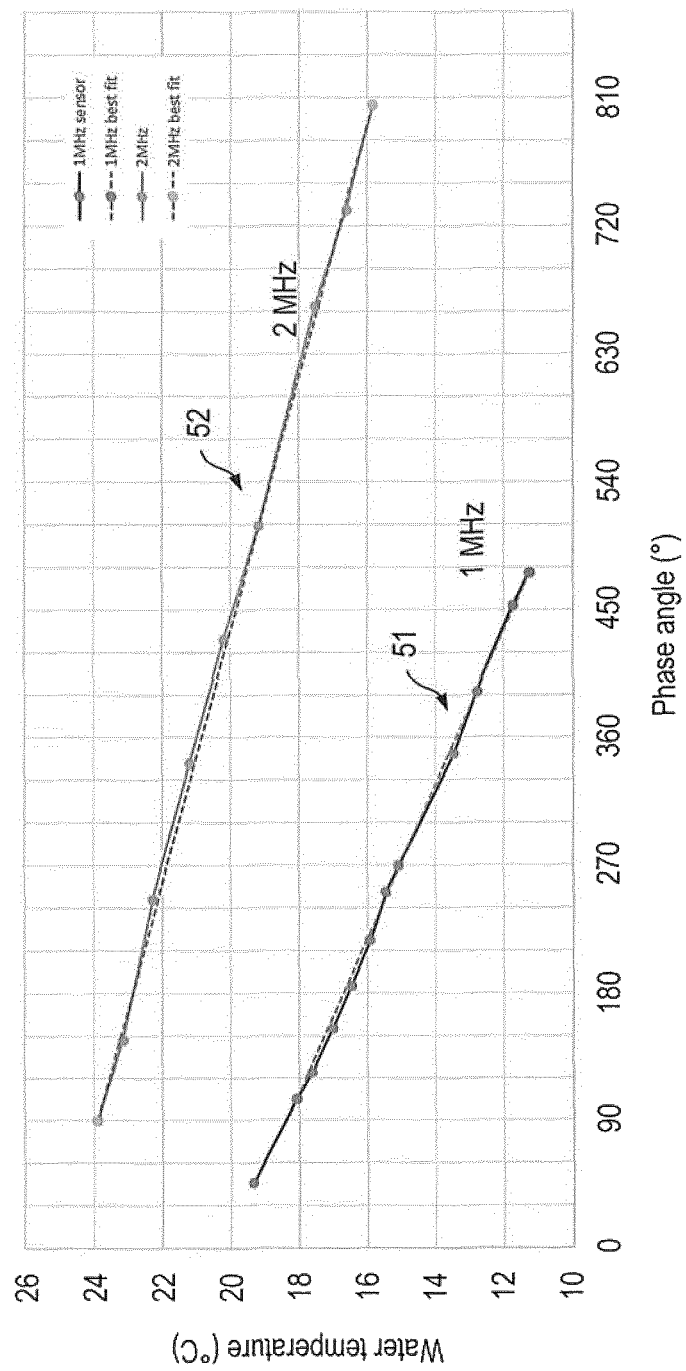
FIG. 4 is a graph showing variation in phase angle against temperature for ultrasonic waves at two different frequencies.

Referring to FIG. 4, first and second plots 51, 52 of measured phase shift against temperature for ultrasonic waves at 1 MHz and 2 MHz propagating through water are shown. As can be seen in FIG. 4, a temperature variation of just a few degrees (about 3° C. for 2 MHz waves and about 2° C. for 1 MHz) can cause a phase shift of 180°. Large phase shifts make it more difficult to determine phase shifts resulting from fluid flow.

Temperature can affect the system in two ways. First, small variations in the phase angle between the electrical and acoustic signals make it difficult to measure the absolute phase angle. Secondly, as will be explained in more detail later, a large movement in the baseline phase angle pushes the measurement point outside of a linear operating region of an XOR phase discriminator.

Figure 5:
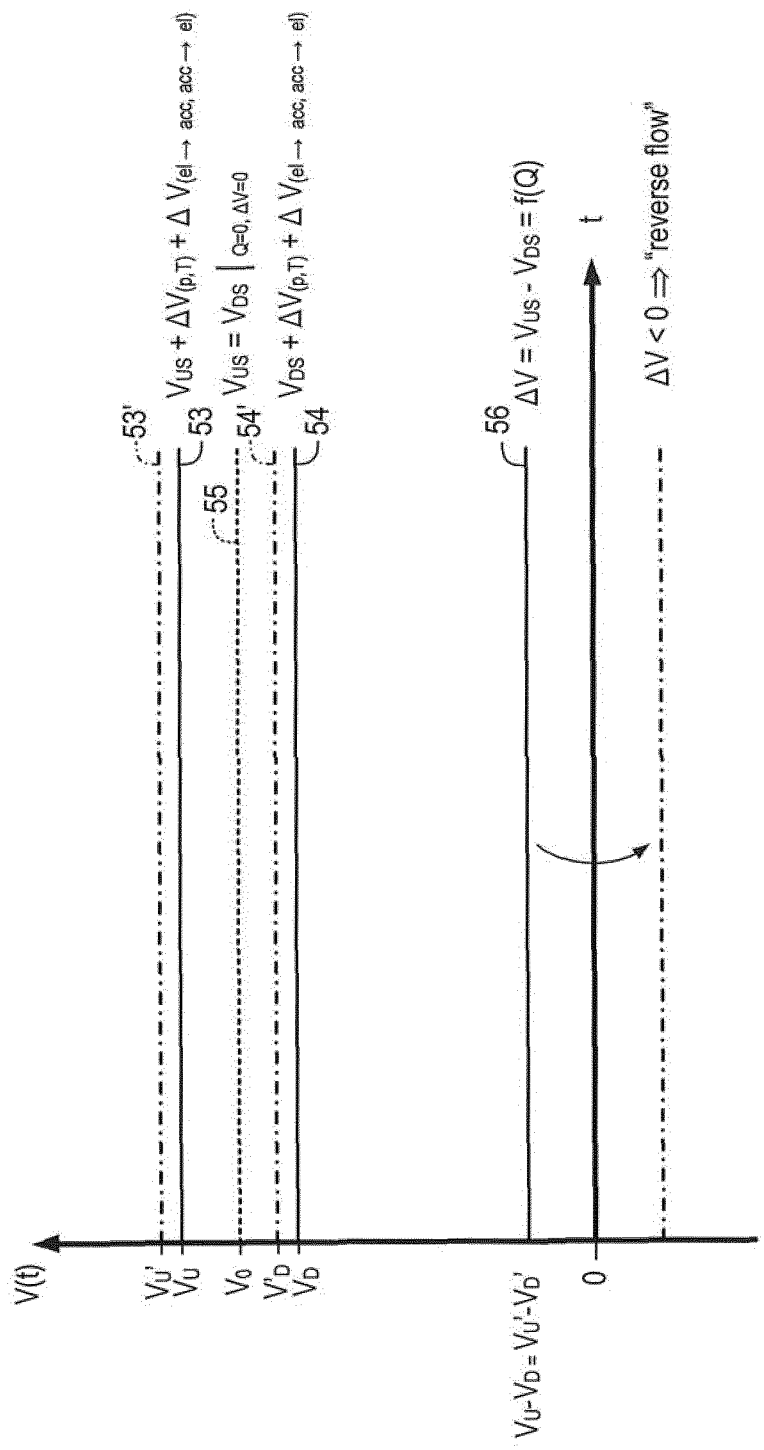
FIG. 5 illustrates differential error compensation.

Referring also to FIG. 5, the effect of temperature on discriminator dc levels for upstream and downstream measurements and how the effect can be ameliorated is shown.

First and second discriminator dc levels 53, 54 for upstream and downstream measurements for a given flow rate at a first temperature lie above and below a third dc level 55 in the absence of flow. The dc signals for the upstream and downstream measurements and zero flow are $V_U$, $V_D$ and $V_o$ respectively. At a different temperature, levels increase resulting in first and second altered dc levels 53', 54'.

The total time of flight for a downstream measurement $TOF_{Tot,DS}$ comprises several components, namely:

$$TOF_{Tot,DS} = TOF_{acc,DS} + \Delta f_{TOF(p,T)} + \Delta t_{Tx,el \to acc(p,T)} + \Delta t_{Rx,acc \to el(p,T)} \quad (6)$$

where $TOF_{acc,DS}$ is the total time of flight from excitation to measurement of an ultrasound wave propagating downstream, $\Delta t_{TOF(p,T)}$ is error resulting from taking the measurement at a pressure and temperature (with respect to some reference), $\Delta t_{Tx,el \to acc(p,T)}$ is a time delay attributable resulting from converting an electrical signal into an ultrasonic signal by the transmitter transceiver (with respect to some reference) and $\Delta t_{Rx,acc \to el(p,T)}$ is a time delay resulting from converting ultrasonic signal into an electrical signal by the receiver transceiver (with respect to some reference).

Likewise, the total time of flight for an upstream measurement $TOF_{Tot,US}$ comprises several components, namely:

$$TOF_{Tot,US} = TOF_{acc,US} + \Delta t_{TOF(p,T)} + \Delta t_{Tx,el \to acc(p,T)} + \Delta t_{Rx,acc \to el(p,T)} \quad (7)$$

where $TOF_{acc,US}$ is the total time of flight from excitation to measurement of an ultrasound wave propagating upstream transceiver at a pressure and temperature (with respect to some reference).

Assuming the errors and time delays are the same for upstream and downstream measurements, the effect of temperature and pressure, and the time delays resulting from converting between electrical and acoustic signals and back again may be compensated for (or at least reduced) by taking the difference between total time of flight for a downstream measurement $TOF_{Tot,DS}$ and total time of flight for an upstream measurement $TOF_{Tot,US}$, i.e. subtracting equations (6) and (7), thereby resulting in an error-compensated differential total time of flight $\Delta TOF_{Tot}$, namely:

$$\Delta TOF_{Tot} = TOF_{Tot,US} - TOF_{Tot,DS} \quad (8)$$

Referring again to FIG. 5, the difference between discriminator dc signals for upstream and downstream measurements can be taken resulting in a differential dc level 56. The differential dc level 56 is substantially insensitive to temperature and pressure. As will be explained in more detail later, the value of $\Delta TOF_{Tot}$ depends on how close to resonance the measurements are taken.

First Control Unit

Figure 6:
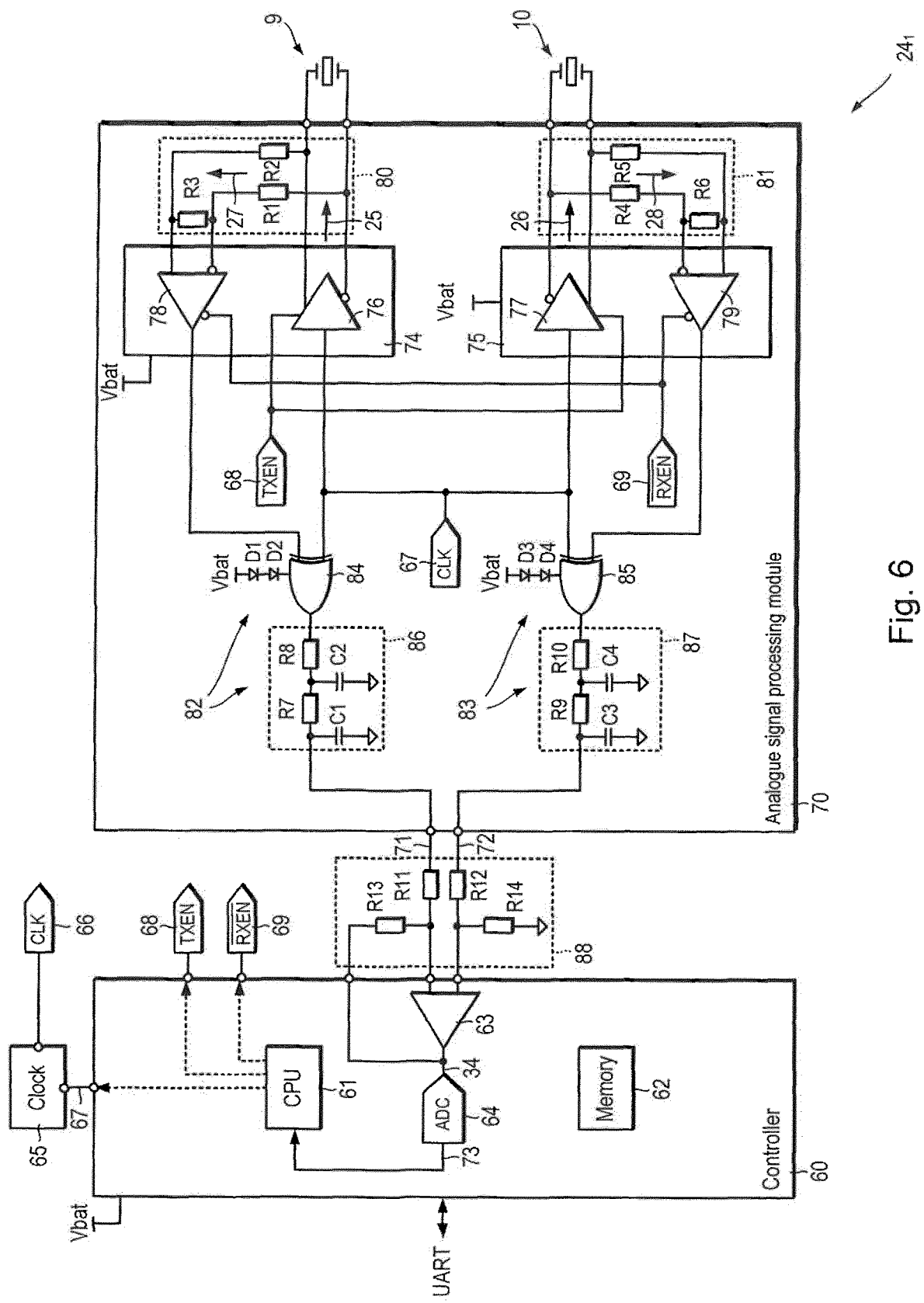
FIG. 6 is a circuit diagram of a first control unit in a phase-based ultrasonic flowmeter system.

Referring to FIG. 6, a first phase-based ultrasonic flowmeter control unit $24_1$ is shown.

The control unit $24_1$ includes a controller 60 which preferably takes the form of a processor-based controller and which more preferably takes the form of a microcontroller. A suitable microcontroller is the RL78/I1D microcontroller or other member of the RL78 family marketed by Renesas Electronics Corporation.

The controller 60 comprises a processor 61 (or "CPU"), memory 62, an on-chip oscillator (not shown), an operational amplifier 63 and an analogue-to-digital converter (or "ADC") 64.

The control unit $24_1$ also includes an excitation clock signal source 65 (herein also referred to as a "resonant clock" or simply "clock") for generating an adjustable-frequency clock signal (or "CLK") 66 according to frequency adjust signal 67. The clock 65 generates a stable, low-jitter, square-wave clock signal 66 (i.e. not a sine wave). The clock 65 can run asynchronously from the controller's oscillator (not shown). The processor-based controller 60 is preferably battery-powered and includes a battery (not shown), although control unit $24_1$ may include or be provided with other sources of 3o power (not shown) such as mains power, solar cell etc.

The controller 60 generates a transmit control signal ("TXEN") 68 and a receive control signal ("RXEN bar") 69 which are supplied to an analogue signal processing module 70 to gate the adjustable-frequency clock signal 66 and to enable and disable transmit and receive modes of the transducers 9, 10.

The analogue signal processing module 70 converts the electrical receive signals 27, 28, into phase-angle dependent signals 71, 72 which are supplied to the controller 60. The operational amplifier 63 is used to generate the differential phase angle signal 34 in dependence upon the phase-angle dependent signals 71, 72. The ADC 64 generates a digitized differential phase angle signal 73.

The analogue signal processing module 70 comprises first and second transceivers 74, 75 each having a respective driver 76, 77 and a respective receiver 78, 79. An example of a suitable transceiver 74, 75 is an ISL83491 RS-485/RS-422 transceiver marketed by Intersil.

The transceivers 74, 75 can be controlled using TXEN 68 and RXEN bar 69 signals. The drivers 76, 77 can be used to drive current and the receivers 78, 79 can function as two-level signal conditioners. Although the drivers 76, 77 and receivers 78, 79 take the form of differential drivers and receiver, single-ended drivers and receivers can be used.

Each transducer 9, to is coupled to a respective transceiver 74, 75. The outputs of the transceiver driver 76, 77 are connected to the terminals of the transducer 9, 10 and the terminals of the transducer 9, to are coupled to the input terminals of the transceiver receiver 78, 79 via a respective matching circuit 80, 81. Each marching circuit 80, 81 includes first and second series resistors R1, R2, R3, R4 for attenuating the received signal 27, 28 and a third resistor R5, R6 coupling the input terminals for providing differential termination. Preferably, the total termination resistance is the same or similar to (for example, within 20% of the value) of the impedance of the transducers 9, 10.

The input terminal of each transceiver driver 76, 77 receives clock signal CLK 66. Each driver output enable of the transceiver drivers 76, 77 is coupled to an I/O port of the controller 60 providing the transmit enable signal TXEN 68.

The analogue signal processing module 70 comprises first and second phase discriminators 82, 83. Each phase discriminator comprises a respective XOR logic gate 84, 85 and first and second low-pass filters 86, 87. An example of a suitable XOR gate is the 74AUC1G86 marketed by Texas Instruments. In this case, the gates have a maximum operating voltage which exceeds the supply rail voltage Vbat (for example at 3.6 V). The supply voltage may be reduced (for to 2.7 V) using a two series diodes D1, D2, D4, D4.

Each output of a transceiver receiver 78, 79 is coupled directly to one of the two inputs of a respective XOR gate 84, 85. The clock signal CLK 66 is supplied to the other of the two inputs of the XOR gate 84, 85. The output of the each XOR gate 84, 85 is supplied to a low-pass filter 86, 87. In this case, each low-pass filter 86, 87 comprises two stages and comprises fourth and fifth resistors R7, R8, R9, R10 arranged in series and first and second capacitors C1, C2, C3, C4 connected to ground.

The outputs of the low-pass filters 86, 87 are coupled to the inputs of the operational amplifier 63 via sixth and seventh series resistors R11, R12 forming part of a resistor network 88. An eighth resistor R13 couples one of the two amplifier inputs to the amplifier output, and a ninth resistor R14 couples the other of the two amplifier inputs to ground. The resistor network 88 comprises discrete, off-chip components. The resistor network 88, however, may be integrated into the controller 60. The operational amplifier 63 and resistor network 88 provide a differential amplifier.

Figure 7:
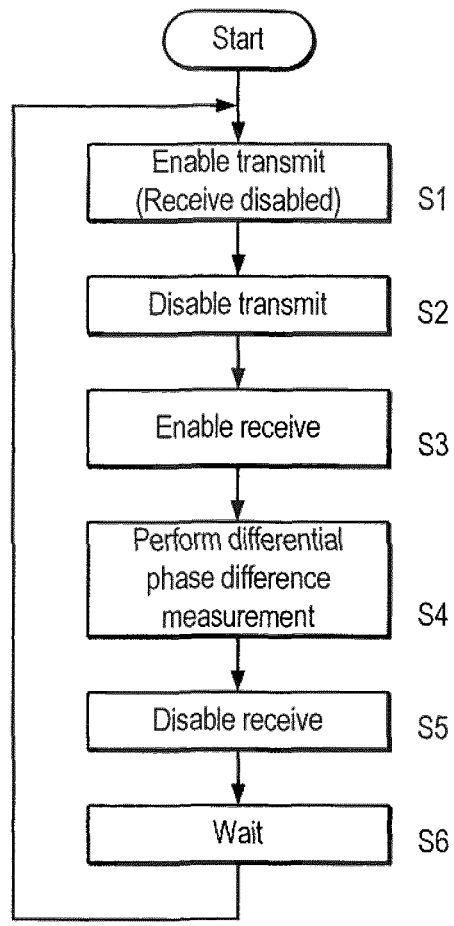
FIG. 7 is a process flow diagram of a method of operating the phase-based ultrasonic flowmeter system shown in FIG. 6.
Figure 8:
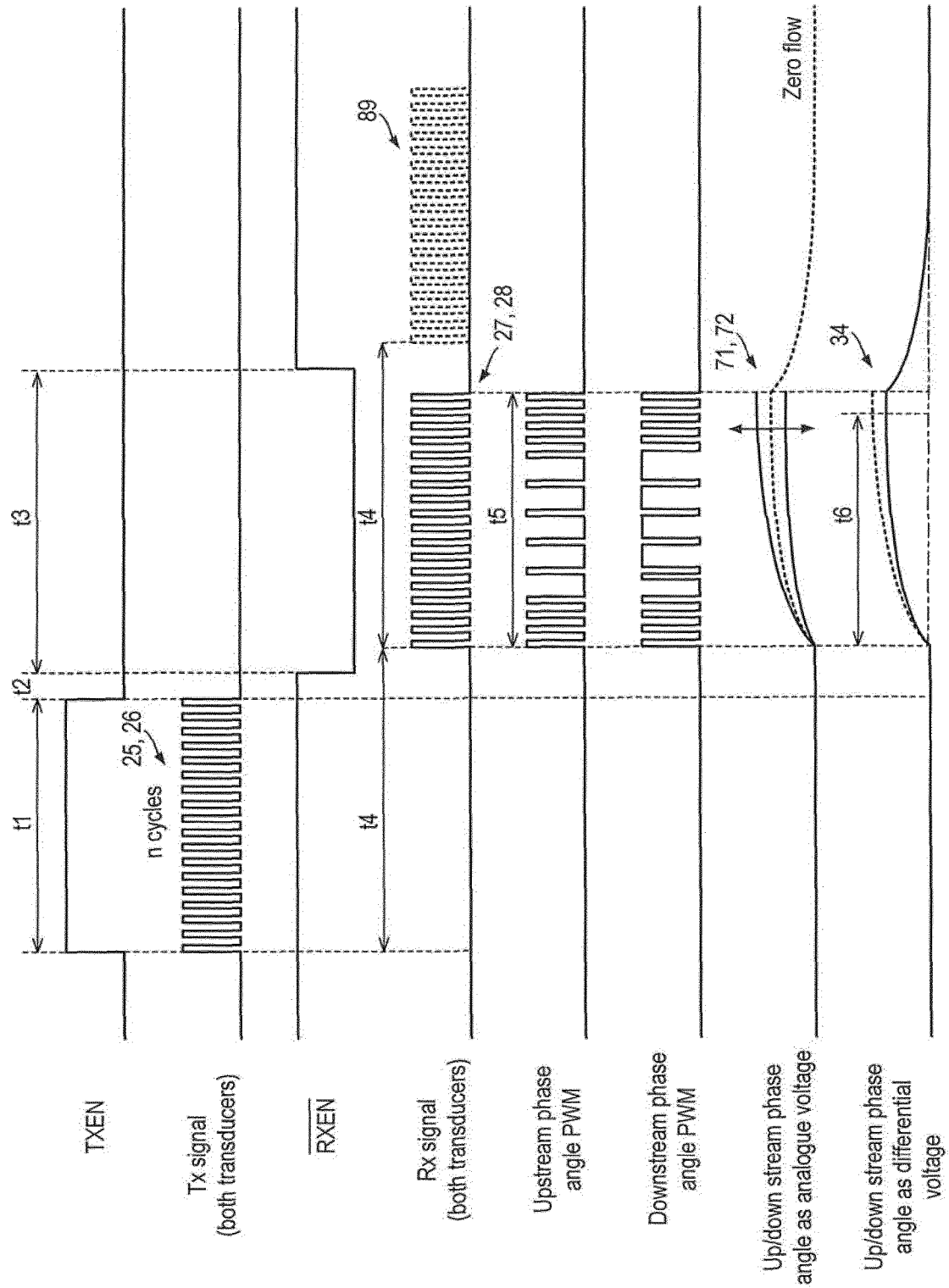
FIG. 8 schematically illustrates signals generated and measured using a phase-based ultrasonic flowmeter system shown in FIG. 6.

Referring also to FIGS. 7 and 8, operation of the controller 6o and the analogue signal processing module 70 will now be described in more detail.

The CPU 61 causes TXEN 68 to be set high, i.e. to enable transmit, for a time period t1 to allow both transducers 9, 10 to transmit a series of n cycles of pulses 25, 26 (step S1). In this case, n=20. The CPU 61 then causes TXEN to be cleared, i.e. disables transmit (step S2), and after a time period t2, to cause RXEN bar to be set low, i.e. to enable receive, for a period t3 (step S3).

Ultrasonic waves 11, 12 (FIG. 12) generated by each transducer 9, 10 cross and start to be received by the opposite transducer 9, 10 after a time period t4 which is defined by 3o the acoustic propagation delay through the fluid 2. The short delay between TXEN clear and RXEN bar set (i.e. time period t2) can be helpful to allow resonance in the transducers 9, 10 to die down.

A differential phase difference measurement is performed (step S4). The received signals 27, 28 from each transducer 9, 10 and the clock signal CLK 66 are compared with the XOR phase discriminators 84, 85 and the resultant PWM signal (which are shown in FIG. 8 in a highly schematic form) are low-pass filtered to convert them into dc voltages 71, 72. The dc voltages 71, 72 are supplied to the controller 6o and the differential amplifier 63, 88 compares the signals 71, 72, resulting in a differential signal 34. The CPU 61 causes RXEN bar to be cleared, i.e. to disable the receive (step S5). This can help to remove measurements of echoes 89.

When there is zero flow, the upstream and downstream propagation times are equal thereby producing equal dc voltages. Increasing flow results in shorter propagation times for waves travelling downstream and longer propagation times for waves propagating upstream.

The operation amplifier 63 provides a single-ended dc voltage 34 which is proportional to the absolute flow rate. As will be explained in more detail later, zero flow should generate a nominally 0V input to the ADC 64 with increasing voltage for increasing flow. The relationship is linear. However, as will be explained in more detail later, there may be a small, non-zero offset. The ADC 64 samples the value 34 at a time t6, once the low-pass filters 86, 87 have settled.

Figure 9:
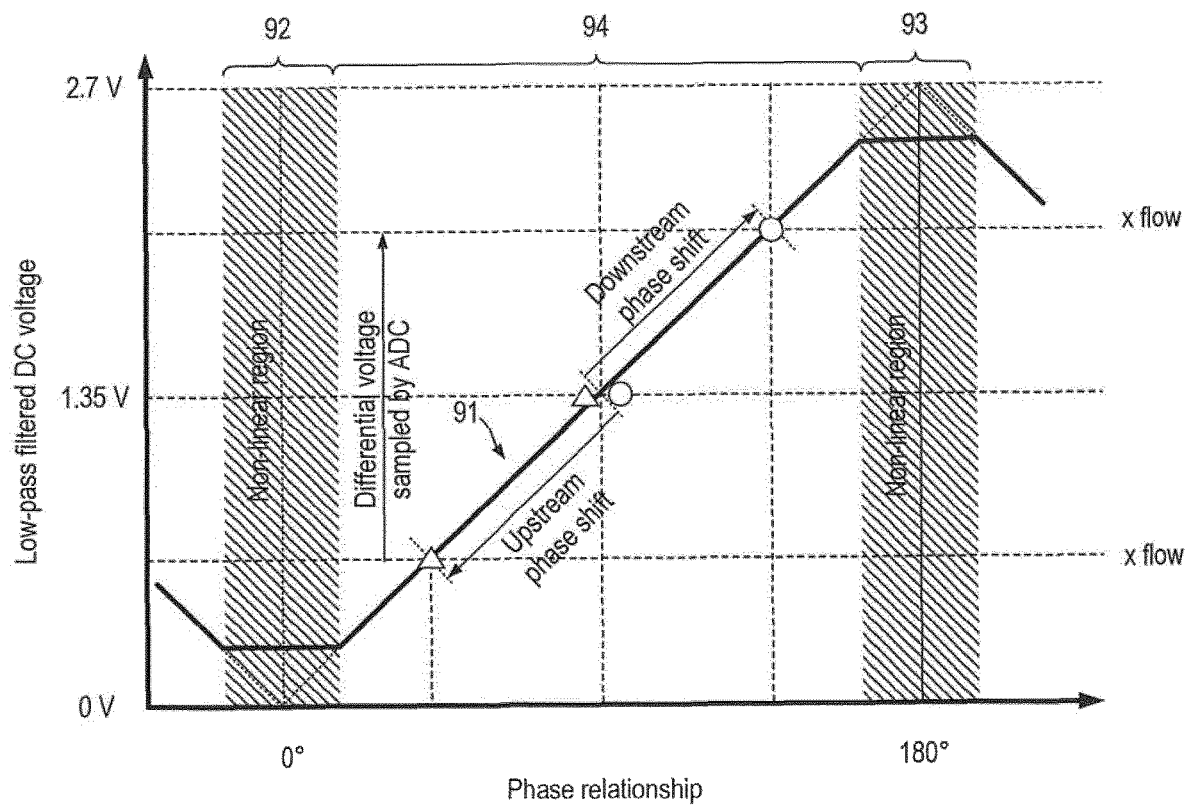
FIG. 9 schematically illustrates phase angle relationship with respect to flow.

Referring to FIG. 9, a phase difference against voltage transfer function 91 is shown.

The XOR phase discriminators 84, 85 produce a PWM output relative to a half-cycle of the resonant frequency. The relationship 91 between the low-pass filtered dc voltage 71, 72 (FIG. 6) and the phase difference is linear around 90°. However, at phase angles near and around 0° and 180°, the XOR gates 84, 85 cannot switch fast enough, resulting the transfer function 91 becoming non-linear. These regions 92, 93 are not used. Thus, the dynamic range 94 of the XOR phase discriminators 84, 85 lies between these non-linear regions 92, 93 and is around 160°.

At zero flow, the target is to tune the phase angle to be 90° so as to giving a 50:50 PWM. This can help to maximise the dynamic range 94 of the flow measurement by giving equal phase angle range for flow-related change in both up and downstream directions before a non-linear region 92, 93 is reached.

To achieve this, zero flow calibration can be performed, as will now be described in more detail.

Zero Flow Calibration

Figure 10:
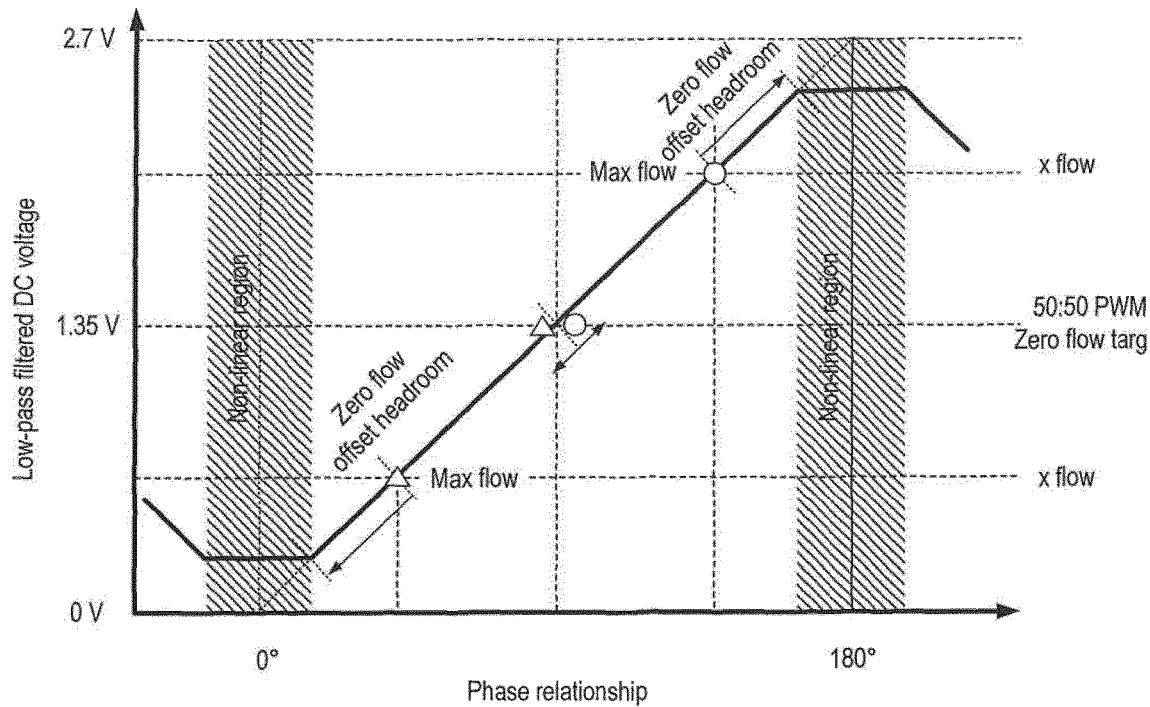
FIG. 10 schematically illustrates zero-flow calibration.
Figure 11:
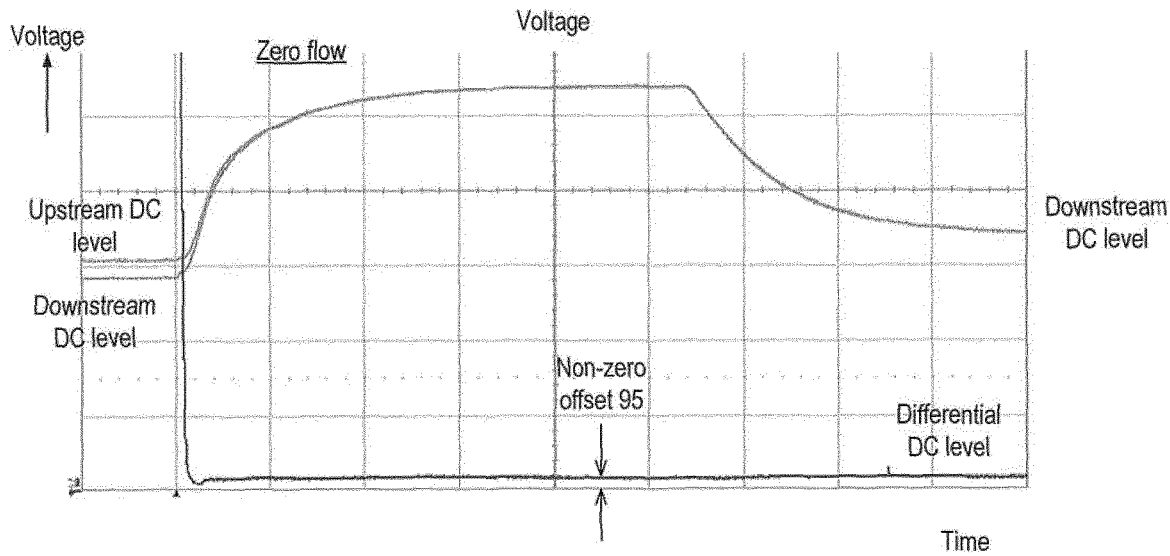
FIG. 11 illustrates zero offset in a differential dc voltage level.

Referring to FIGS. 10 and 11, as hereinbefore described, zero-flow phase angle is adjusted to give as close to a 50:50 PWM signal as possible to maximise the measurement dynamic range. Small changes in the frequency of the clock 66 (FIG. 6) at or near the resonant frequency allows the phase angle to be pulled in either direction. At zero-flow, for different clock frequencies, the dc level sampled by the ADC 64 (FIG. 6) is measured in order to determine the analogue offset of the measurement system.

At zero flow, the upstream and downstream phase angle differential should be zero, resulting in a zero-dc output 34 (FIG. 6) from the operation amplifier 63 (FIG. 6). However, as can be seen in Figure ii, there is a non-zero offset 95. Thus, the offset voltage 95 can be stored and used as a calibration factor.

Experimental Results

Figure 12:
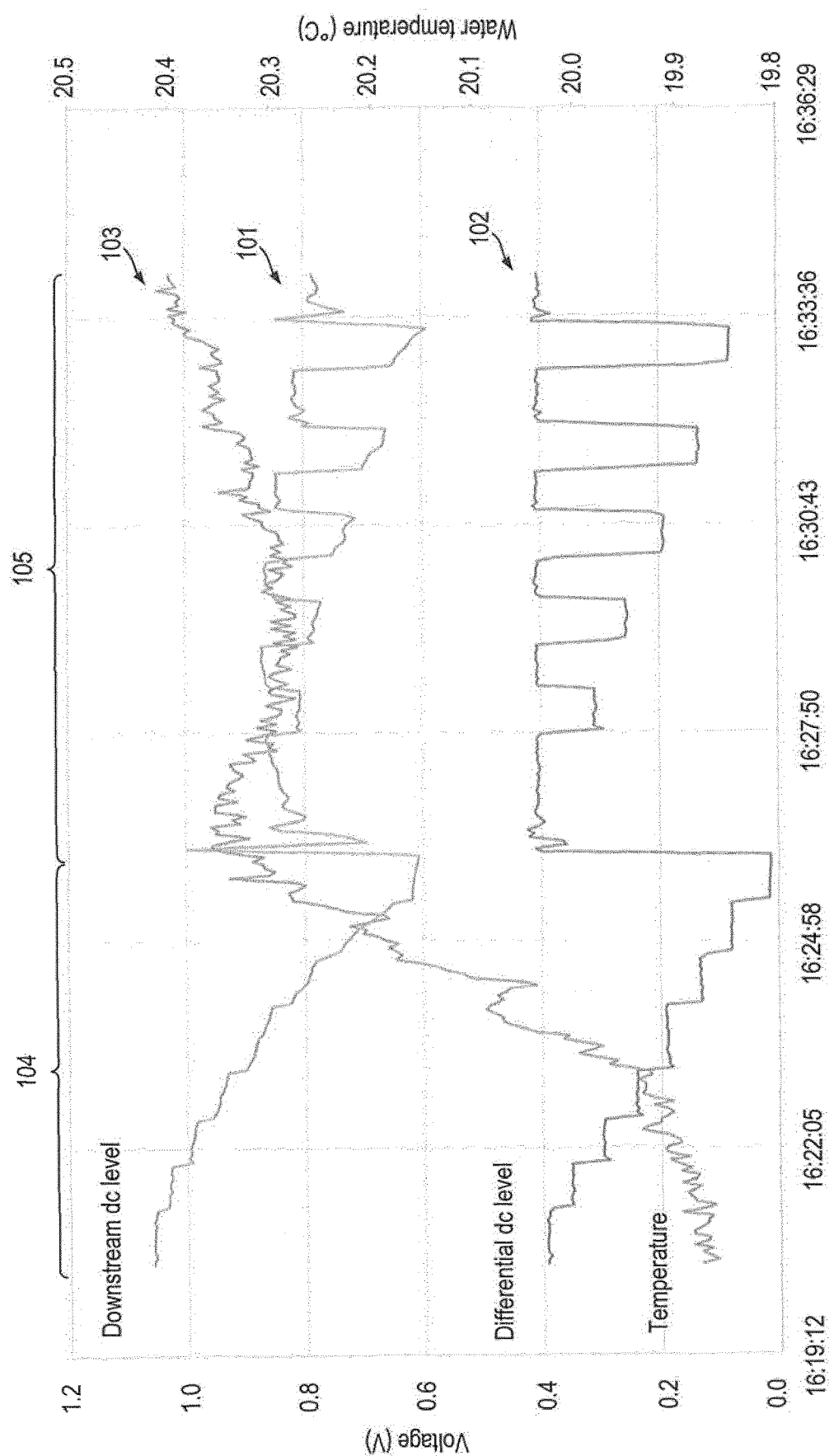
FIG. 12 shows measurements of downstream dc voltage, differential dc voltage and temperature against time.

Referring to FIG. 12, first, second and third plots 101, 102, 103 of downstream dc voltage, differential dc voltage and temperature respectively against time are shown.

The first plot 101 shows the output 72 (FIG. 6) of the low-pass filter 83 (FIG. 6). The second plot 102 shows the output 34 (FIG. 6) of the operation amplifier 64 (FIG. 6).

An experiment was carried out involving, in a first stage 104, reducing the flow speed Q of flow from maximum speed Q=Qmax to zero speed Q=0 in a series of steps and, in a second stage 105, pulsing the flow rate between the maximum speed Q=Qmax and a value which is reduced stepwise from Q=Qmax towards zero.

The impact of temperature on downstream dc voltage is clearly seen in that although flow stays constant at a given level, the voltages starts to drop as a result of the thermal drift. The third plot 103 shows the system's temperature T, which starts to increase as 3o flowrate is reduced and the rate of heat removal is slowed. There is, however, little, if any impact of temperature on differential dc voltage.

Figure 13:
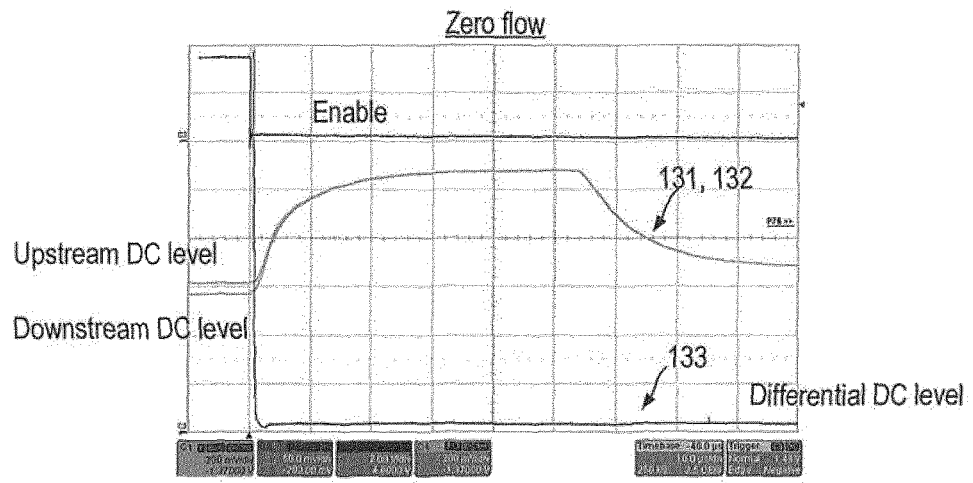
FIG. 13 shows measurements of downstream dc voltage, upstream dc voltage and differential voltage against time at zero flow.
Figure 14:
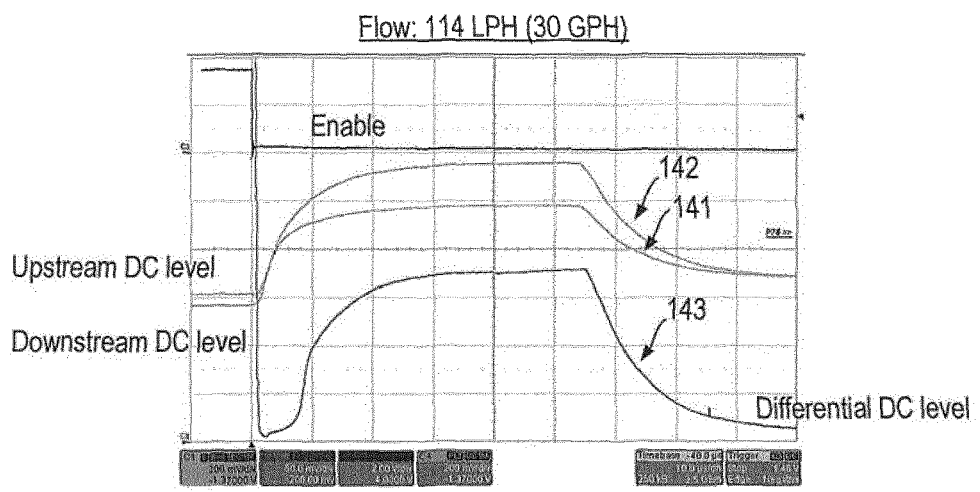
FIG. 14 shows measurements of downstream dc voltage, upstream dc voltage and differential voltage against time at 114 litres per hour.
Figure 15:
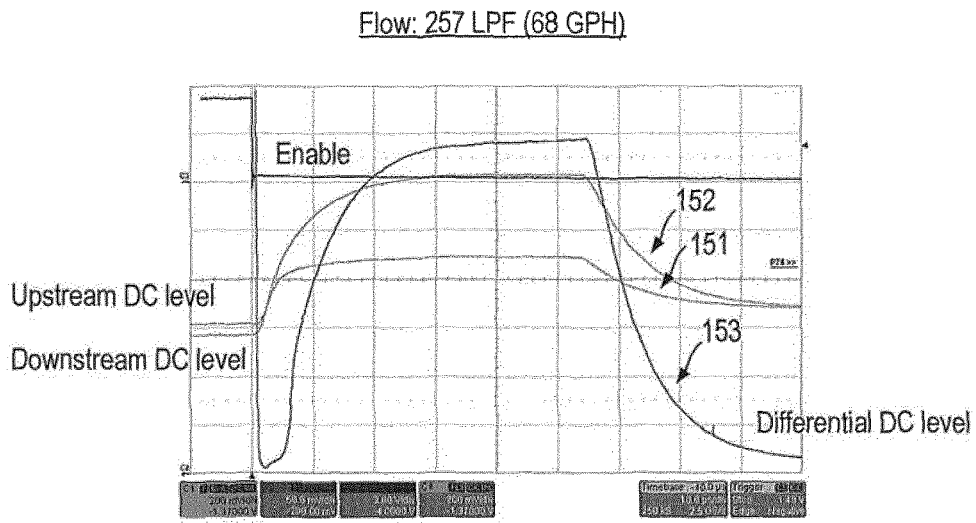
FIG. 15 shows measurements of downstream dc voltage, upstream dc voltage and differential voltage against time at 257 litres per hour.

Referring to FIGS. 13, 14 and 15, plots 131, 132, 141, 142, 151, 152 of upstream and downstream dc levels 71, 72 (FIG. 6) from the low-pass filters 86, 87 (FIG. 6) and respective plots 133, 143, 153 of the differential voltage 34 (FIG. 6) between the upstream and downstream dc levels 71, 72 (FIG. 6) at three different flow rates are shown. The results are obtaining at 2 MHz using Morgan (Ceramtec) transducers.

Second Control Unit

Figure 16:
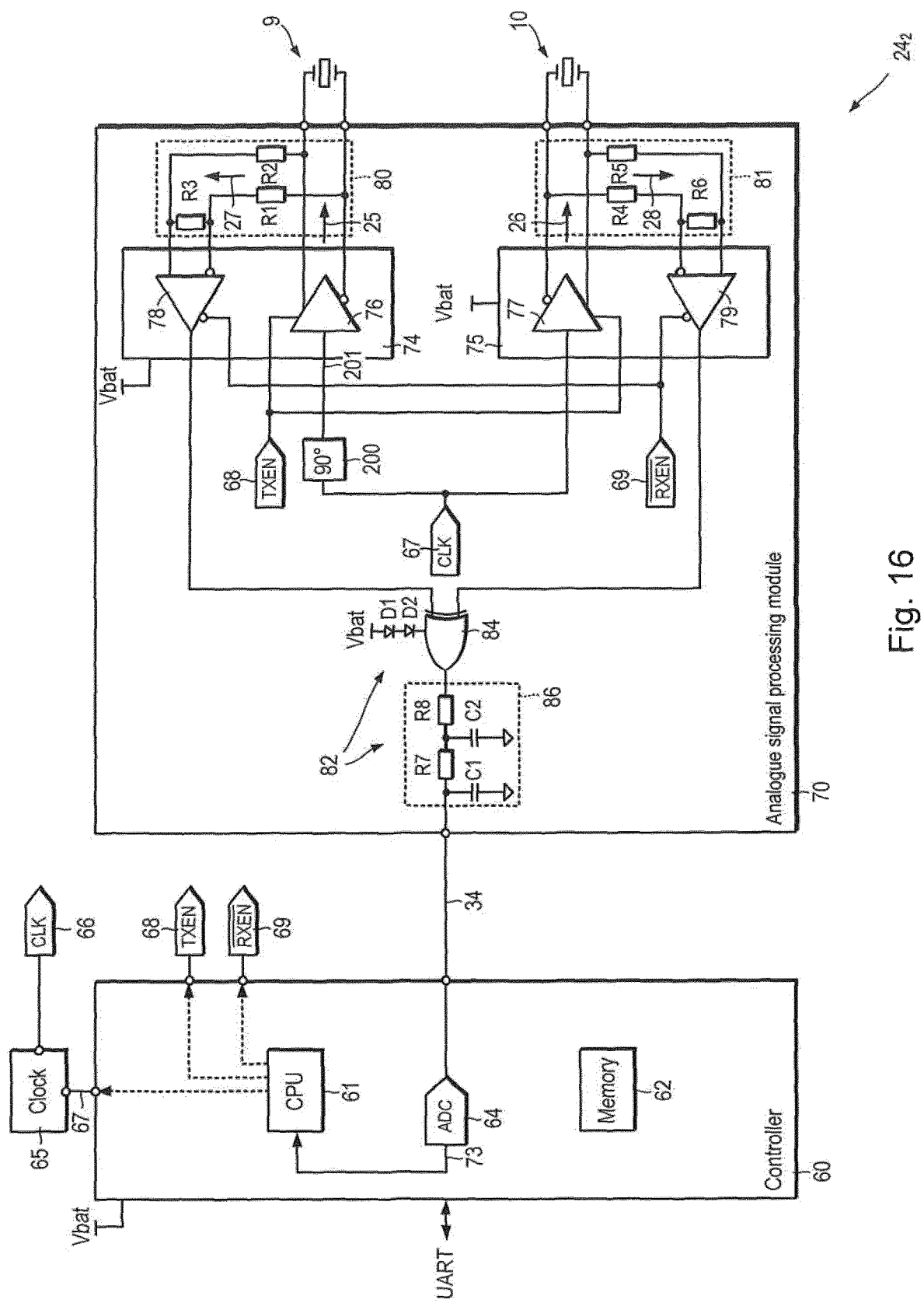
FIG. 16 is a circuit diagram of a second control unit in a phase-based ultrasonic flowmeter system.

Referring to FIG. 16, a second phase-based ultrasonic flowmeter control unit 242 is shown.

The second phase-based ultrasonic flowmeter control unit 242 is similar to the first control unit 242 except that rather than determine phase-angle dependent signals 71, 72 by comparing the receive signals 27, 28 with the CLK 66 and then subtract one signal from the other, a 90° phase shift is introduced into one of the excitations signals 25, 26 and phase discrimination is performed by comparing the phases of the receive signals 27, 28.

The analogue signal processing module 70 includes a 90° phase shifter 200 which generates a 90° phase-shifted clock signal 201 which is supplied to the first driver 76. Thus, the second XOR logic gate 85 and the second low-pass filter 87 of the first control unit $24_1$ (FIG. 6) need not be used and can be omitted. Instead, the output of the second receiver 79 is supplied to the second input of the (first) XOR logic gate 84 and the output of the (first) low-pass filter 86 is supplied to the input of the ADC 64. Thus, the operational amplifier 63 of the first control unit $24_1$ (FIG. 6) need not be used and can be omitted.

The XOR logic gate function need not be implemented using a single XOR logic gate as shown, but could be implemented using combinations of logic gates and/or electronic components (which may or may not be discrete components).

The control unit 242 has the advantage that the clock 65 need not be run when the receive signals 27, 28 are processed and, thus, can help to reduce power consumption.

Modifications

It will be appreciated that various modifications may be made to the embodiments hereinbefore described. Such modifications may involve equivalent and other features which are already known in the design, manufacture and use of ultrasonic flowmeters and component parts thereof and which may be used instead of or in addition to features already described herein. Features of one embodiment may be replaced or supplemented by features of another embodiment.

An external clock signal source need not be used. Instead, the controller, for example in the form of a microcontroller, may provide the clock signal CLK.

The controller may take the form of another type of integrated circuit (IC), preferably a mixed-signal IC, such as a system-on-a-chip (SoC), a programmable system-on-a-chip (PSoC), application-specific integrated circuit (ASIC), application-specific standard part (ASSP), a multichip-module (MCM), a system-in-a-package (SIP) (together with discrete components) or a complex programmable logic device (CPLD), i.e. an FPGA with analogue processing capabilities.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. An ultrasonic flow measurement system comprising:
   a signal generator configured to generate a first excitation signal for a first ultrasonic transducer and a second excitation signal for a second, different ultrasonic transducer; and
   a phase differentiator configured to generate a differential phase angle signal indicative of a difference in phase angle between first and second receive signals received from the first and second transducers,
   wherein the phase differentiator comprises:
      an XOR gate having first and second inputs and an output; and
      a low-pass filter having an input and an output;
   wherein the first input of the XOR gate is configured to receive the first receive signal or a signal obtained from the first receive signal and the second input of the XOR gate is configured to receive the second receive signal or a signal obtained from the second receive signal;
   wherein the output of the XOR gate is directly coupled to the input of the low pass filter, and wherein the output of the low-pass filter provides the differential phase angle signal.

2. An ultrasonic flow measurement system according to claim 1, wherein the signal generator is configured to provide the first and second excitation signals to the first and second transducers such that the first and second receive signals overlap when received by the phase differentiator.

3. An ultrasonic flow measurement system according to claim 1, wherein the signal generator comprises a clock configured to generate a clock signal and the signal generator is configured to generate the first excitation signal and the second excitation signal in dependence upon the clock signal.

4. An ultrasonic flow measurement system according to claim 1, further comprising:
   a phase shifter to cause a phase shift to be introduced between the first and second excitation signals.

5. An ultrasonic flow measurement system according to claim 1, further comprising:
   an analogue-to-digital converter configured to sample the differential signal.

6. An ultrasonic flow measurement system according to claim 1, further comprising:
   a controller comprising a processor configured to control the signal generator.

7. An ultrasonic flow measurement system according to claim 6, wherein the controller comprises the differential amplifier.

8. An ultrasonic flow measurement system according to claim 6, wherein the controller comprises an integrated circuit.

9. An ultrasonic flow measurement system according to claim 8, wherein the integrated circuit is a microcontroller.

10. An ultrasonic flow measurement system according to claim 6, wherein the controller is configured to vary frequency of a clock signal used to generate the first and second excitation signals so as to reduce the differential signal at zero flow.

11. An ultrasonic flow measurement system according to claim 1, further comprising:
    a first transceiver comprising a driver and a receiver, wherein the driver is configured to output the first excitation signal and the receiver is configured to receive the first receiver signal; and
    a second transceiver comprising a driver and a receiver, wherein the driver is configured to output the second excitation signal and the receiver is configured to receive the second receive signal.

12. An ultrasonic flow measurement system according to claim 11, further comprising:
    a first impedance matching circuit for providing impedance matching between the first transducer and inputs to the first transceiver receiver; and
    a second impedance matching circuit for providing impedance matching between the second transducer and inputs to the second transceiver receiver.

13. An ultrasonic flow measurement system according to claim 1, further comprising:
    a first ultrasonic transducer configured to receive the first excitation signal from the signal generator and to provide the first receive signal to the first phase discriminator; and
    a second ultrasonic transducer configured to receive the second excitation signal from the signal generator and to provide the first receive signal to the second phase discriminator.

* * * * *